United States Patent

Sakamoto

[15] 3,670,356
[45] June 20, 1972

[54] WIPER ARMS

[72] Inventor: Kashira Sakamoto, 12, Tennocho-7-chome, Kariya-shi, Japan

[22] Filed: Feb. 4, 1971

[21] Appl. No.: 112,675

[30] Foreign Application Priority Data

March 19, 1970 Japan....................................45/26406
March 19, 1970 Japan....................................45/26407

[52] U.S. Cl........................................15/250.35, 15/250.39
[51] Int. Cl. ..........................................................B60s 1/32
[58] Field of Search ....................15/250.31, 250.34, 250.35, 15/250.39, 250.42

[56] References Cited

UNITED STATES PATENTS

| | | |
|---|---|---|
| 2,027,362 | 1/1936 | Anderson et al................15/250.35 X |
| 2,094,732 | 10/1937 | Anderson........................15/250.35 X |
| 2,312,279 | 2/1943 | Zaiger..............................15/250.35 X |

*Primary Examiner*—Peter Feldman
*Attorney*—Cushman, Darby & Cushman

[57] ABSTRACT

A wiper arm in which a wiper arm consisting of a U-shaped rod is secured to a retainer at the U-shaped end and also at the two rod sections thereof. The U-shaped end of the wiper arm is secured to the retainer in the detachable fashion, while the two rod sections thereof are secured to the retainer in the longitudinally slidable fashion relative to the latter, whereby the length of the wiper arm is adjustable.

3 Claims, 6 Drawing Figures

PATENTED JUN 20 1972 3,670,356

INVENTOR

KASHIRO SAKAMOTO

BY Cushman, Darby & Cushman
ATTORNEYS

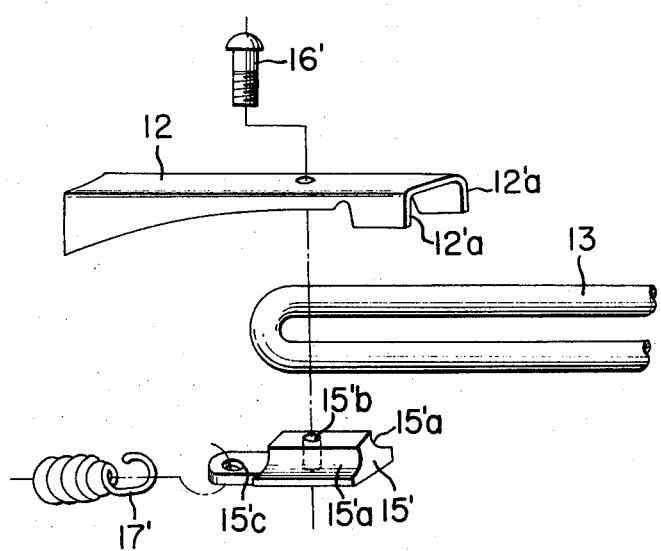

WIPER ARMS

The present invention relates generally to a wiper assembly for use with automobiles or the like, and more particularly to a wiper arm having an arm piece which consists of two rods to minimize the resistance to air for the prevention of lifting of a wiper blade under the effect of upward air flow occurring on the vehicle body during running of the vehicle at a high speed.

A conventional wiper arm of the type described comprises an arm head detachably connected to an arm driving shaft, a retainer pivotably connected to said arm head and an arm piece consisting of two rods welded to said retainer. Because of the arm piece consisting of two rods, the conventional wiper arm had the drawback that the operation efficiency in attaching a fixing plate to the two rods to combine the same integrally with each other or in securing the arm piece to the retainer is poor. Furthermore, in the conventional wiper arm, the length thereof is not freely adjustable, and hence a specific wiper arm must be produced for each type of vehicle, which has been a biggest problem in the mass production of the wiper arm.

An object of the present invention, therefore, is to provide a wiper arm which obviates the aforesaid drawback and in which use is made, as an arm piece, of a single rod bent into a U-shape, whereby the heretofore used fixing plate to combine two rods can be eliminated and the operation of securing the arm piece to the retainer is facilitated and consequently the operation efficiency in assembly of the wiper arm is enhanced.

Another object of the invention is to provide a wiper arm in which an arm piece is clamped between a retainer and a mounting block, and secured to the retainer by means of a screw, whereby the position of the arm piece relative to the retainer is adjustable upon loosening the screw, to adjust the length of wiper arm, and which, therefore, can be used with any and all types of vehicle and is adapted for mass production.

The present invention will be described in detail by way of example with reference to the accompanying drawings, in which:

FIG. 6 is an exploded enlarged perspective view of the wiper arm shown in FIG. 5.

Figure 1:
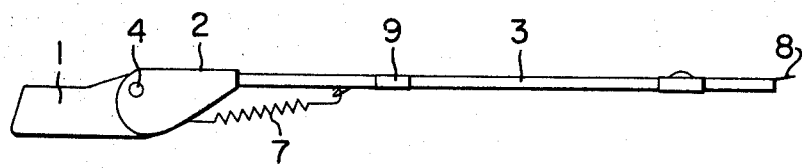
FIGS. 1 and 2 are a front elevational view and a bottom view respectively of a conventional wiper arm.
Figure 2:
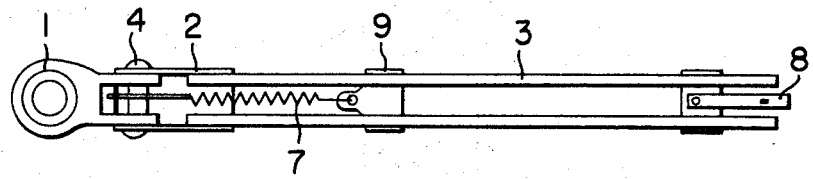

A conventional wiper arm, as shown in FIGS. 1 and 2, is composed of an arm head 1 detachably connected to an arm driving shaft not shown, a retainer 2 pivotably connected to said arm head 1 and an arm piece 3 consisting of two rods welded to said retainer 2. Since the arm piece 3 consists of two rods, the operation of attaching a fixing plate to the two rods to combine the same integrally with each other or the operation of securing the arm piece 3 to the retainer 2 is time-consuming and laborious. Further, since the length of the wiper arm is not freely adjustable, a number of types of wiper arms must be provided each for each type of vehicle.

Figure 3:
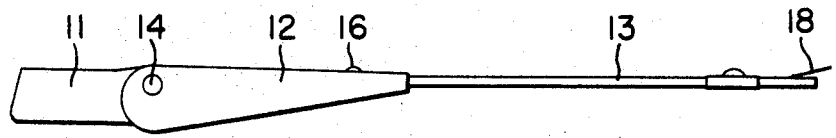
FIG. 3 is a front elevational view of an embodiment of the wiper arm according to the invention.
Figure 4:
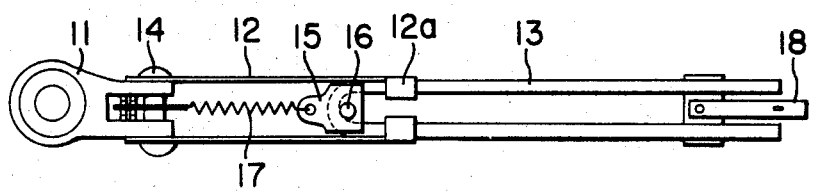
FIGS. 4 and 5 are bottom views of the embodiment of FIG. 3 and another embodiment of the invention respectively.

Now, an embodiment of the present invention will be described with reference to FIGS. 3 and 4. In FIGS. 3 and 4, reference numeral 11 designates an arm head, and 12 designates a retainer pivotably connected to said arm head 11 by means of a rivet and provided with arm piece clinching lugs 12a at its end opposite to the arm head 1. An arm piece 13 is formed by bending a single rod into a U-shape and the U-shaped end of the arm piece is clamped between a mounting block 15 and the retainer 12, and integrally secured to said retainer 12 by means of a rivet 16. The arm piece 13 is also secured to the retainer 12 at the two parallel rod sections thereof by the clinching lugs 12a which are tightly lapped around said rod sections respectively. Reference numeral 17 designates a tension spring which urges a wiper blade, not shown, into pressure contact with the glass, and which has one end anchored to the arm head 11 and the other end to the mounting block 15. Reference numeral 18 designates a leaf spring by which the wiper arm is connected to the wiper blade not shown.

According to the present invention, as described above, the arm piece 13 is formed by bending a single rod into a U-shape. Therefore, it is unnecessary to integrally combine two rods by the fixing plate 9 as is in the conventional wiper arm of the type shown in FIGS. 1 and 2, and, therefore, the operation efficiency in assembly of the wiper arm can be enhanced and the strengthwise stability of the wiper arm can be improved. Furthermore, since the arm piece 13 is secured to the retainer 12 by compressive force and the U-shaped end thereof is engaged by the rivet 16, there is no fear of the arm piece from slipping off the retainer 12. If, in the conventional wiper arm, the arm piece 3 is secured to the retainer 2 by compression, the fear of the arm piece 3 to slip off the retainer 2 will be unavoidable, and it is for this reason that the arm piece 3 has been secured to the retainer 2 by welding, even though there is the possibility of deformation of said arm piece at the time of welding.

Figure 5:
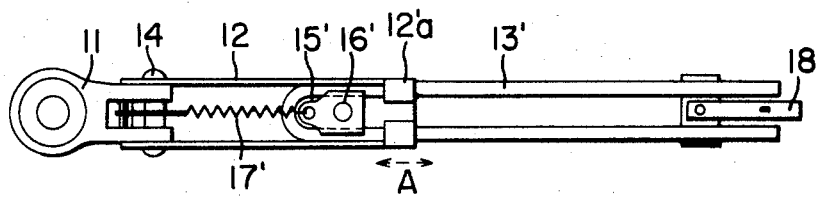

Another embodiment of the invention will be described with reference to FIGS. 5 and 6 hereunder: In FIGS. 5 and 6, an arm head 11, a retainer 12, an arm piece 13, a rivet 14 and a leaf spring 18 are the same as the corresponding components of the embodiment shown in FIG. 4. Reference numeral 15' designates a mounting block for clamping the U-shaped end portion of the arm piece 13 between it and the inner surface of the retainer 12, which, as shown in FIG. 6, is provided with arm piece receiving grooves 15'a on both sides and also with a vertically extending threaded hole 15'b for receiving a screw 16'. Reference numeral 17' designates a tension spring for urging a wiper blade, not shown, into pressure contact with the glass, which has one end anchored to the arm head 11 and the other end to a retainer hole 15'c provided in the mounting block 15'.

In assembling the wiper arm constructed as described above, the U-shaped end of the arm piece 13 is fitted in the arm piece receiving grooves 15'a in the mounting block 15' and then the assembly of said arm piece 13 and said mounting block 15' is attached to the inner surface of the retainer 12 and the screw 16' is externally threaded into the threaded hole 15'b in said mounting block, whereby the arm piece 13 is secured to the retainer 12. Thereafter, the clinching lugs 12'a of the retainer 12 are lapped around the parallel rod sections of the arm piece 13 to make more positive the securement of said arm piece 13 to said retainer 12. In this case, the clinching lugs 12'a obviously are lapped around the two rod sections of the arm piece 13 in such a manner as to permit said arm piece to slide in direction of the arrow A. Thus, it will be seen that, upon loosening the screw 16', the arm piece 13 is freely slidable while being guided by the arm piece receiving grooves 15'a of the mounting block 15' and the arm piece clinching lugs 12'a of the retainer 12, and the length of the arm can be adjusted.

What is claimed is:

1. A wiper arm of the type comprising an arm head detachably connected to an arm driving shaft, a retainer pivotably connected to said arm head, an arm piece consisting of two rod members and connected to said retainer, and a tension spring extended between said arm piece and said arm head, wherein said arm piece is formed by bending a single rod into a substantially U-shape to form parallel rod sections and is secured to said retainer at the U-shaped end thereof.

2. A wiper arm of the type comprising an arm head detachably connected to an arm driving shaft, a retainer pivotably connected to said arm head, an arm piece consisting of two rod members and connected to said retainer, and a tension spring extended between said arm piece and said arm head, wherein said arm piece is formed by bending a single rod into a substantially U-shape to form parallel rod sections and is secured to said retainer at the U-shaped end and the parallel rod sections thereof.

3. A wiper arm of the type comprising an arm head detachably connected to an arm driving shaft, a retainer pivotably connected to said arm head, an arm piece consisting of two rod members and connected to said retainer, and a tension spring extended between said arm piece and said arm head, wherein said arm piece is formed by bending a single rod into a substantially U-shape to form parallel rod sections and is detachably secured to said retainer at the U-shaped end and longitudinally slidably secured to said retainer at the parallel rod sections thereof.

* * * * *